Sept. 4, 1951  W. T. SCHELD  2,566,996
AUTOMOBILE BED
Filed Sept. 15, 1947  2 Sheets-Sheet 1

INVENTOR
W. T. Scheld
BY
ATTORNEYS

Sept. 4, 1951 W. T. SCHELD 2,566,996
AUTOMOBILE BED
Filed Sept. 15, 1947 2 Sheets-Sheet 2

INVENTOR
W. T. Scheld
BY
ATTORNEYS

Patented Sept. 4, 1951

2,566,996

UNITED STATES PATENT OFFICE 2,566,996

AUTOMOBILE BED

Walter T. Scheld, Merced, Calif.

Application September 15, 1947, Serial No. 774,043

5 Claims. (Cl. 5—118)

This invention is directed to, and it is an object to provide, an improved bed for automobiles; the bed being adapted to be mounted, in an automobile, extending within the rear seat compartment and rear trunk after removal of the rear seat cushion and back, together with any partition in the forward portion of said trunk.

Another object of the invention is to provide an automobile bed which is of demountable structural arrangement, including separable parts, whereby when not in use the bed parts may be carried in a compact bundle and thus not interfere with normal use of the automobile.

A further object of the invention is to provide an automobile bed which includes a hammock unit, and novel supporting post assemblies for opposite ends of the hammock unit; the supporting post assembly for the rear end of the hammock unit being mounted on the trunk deck, and the supporting post assembly for the front end of said hammock unit being removably mounted, in unique manner, on the floor between the front seat and rear seat riser.

An additional object is to incorporate, in one of said post assemblies, a novel arrangement for releasably tensioning the hammock unit for use.

A further object of the invention is to provide a practical and convenient automobile bed, and one which will be exceedingly effective for the purpose for which it is designed.

These objects are accomplished by means of such structure and relative arrangement of parts as will fully appear by a perusal of the following specification and claims.

Figure 1:
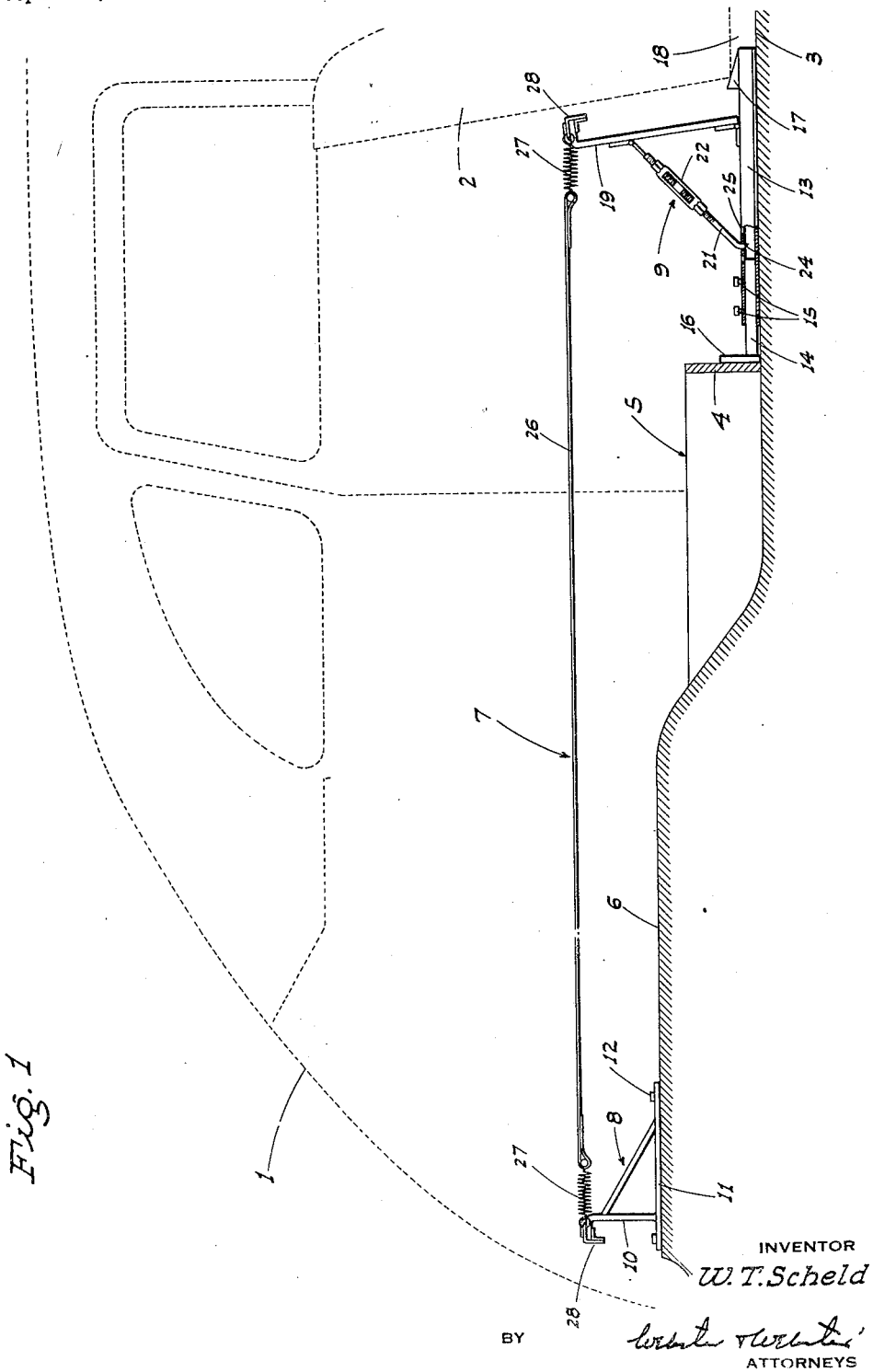
Fig. 1 is a side elevation of the bed as mounted in an automobile.
Figure 2:
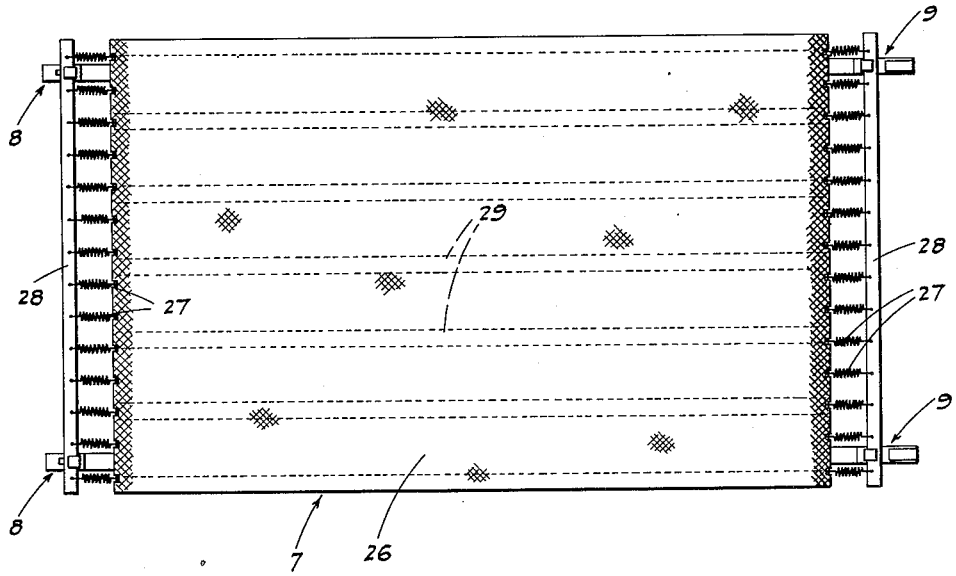
Fig. 2 is a top plan view of the bed.
Figure 3:
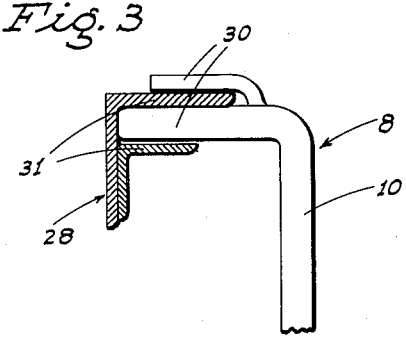
Fig. 3 is an enlarged fragmentary sectional elevation, illustrating the detachable coupling means as employed between the rails of the hammock unit and the corresponding upstanding posts.

Referring now more particularly to the characters of reference on the drawings, the bed is adapted for use in an automobile which includes, within a body 1, a front seat 2; a rear floor 3; a rear seat riser 4; a rear seat platform 5; and a trunk deck 6; there being a single longitudinal compartment defined within the automobile body 1 upon removal of the rear seat cushion and back, together with any partition in the forward portion of the trunk.

The bed comprises a longitudinal hammock unit, indicated generally at 7; a rear post assembly, indicated generally at 8; and a front post assembly, indicated generally at 9. The rear post assembly 8 is mounted on the trunk deck 6, whereas the front post assembly 9 is mounted on the rear floor 3, with the hammock unit 7 stretched between said post assemblies when in use.

The rear post assembly 8 comprises a pair of transversely spaced, upstanding posts 10 affixed to mounting plates 11 secured to the trunk deck 6 by bolts 12.

The front post assembly 9 comprises a pair of longitudinal, transversely spaced base bars 13 which removably rest on the rear floor 3 of the automobile body. Such base bars 13 include longitudinally adjustable, rearwardly projecting legs 14 whose adjustment is set by screws 15, and at the rear end each leg 14 is fitted with a foot 16 which abuts the rear seat riser 4, as shown in Fig. 1.

At its forward end each base bar 13 includes a wedge block 17 which engages beneath the front seat 2 in the manner shown in Fig. 1, whereby to prevent upward motion of the base bar 13 when the bed is in use. Automobiles conventionally have a space 18 between the front seat 2 and rear floor 3 which permits of insertion of the forward end of said base bar 13 and the wedge block 17 in the manner described. The adjustable leg 14 of each base bar 13 is set so that said base bar is relatively forcefully engaged in its described position.

A front post 19 upstands from each base bar 13, and is hinged thereto, for longitudinal swinging motion, by a hinge 20.

Figure 4:
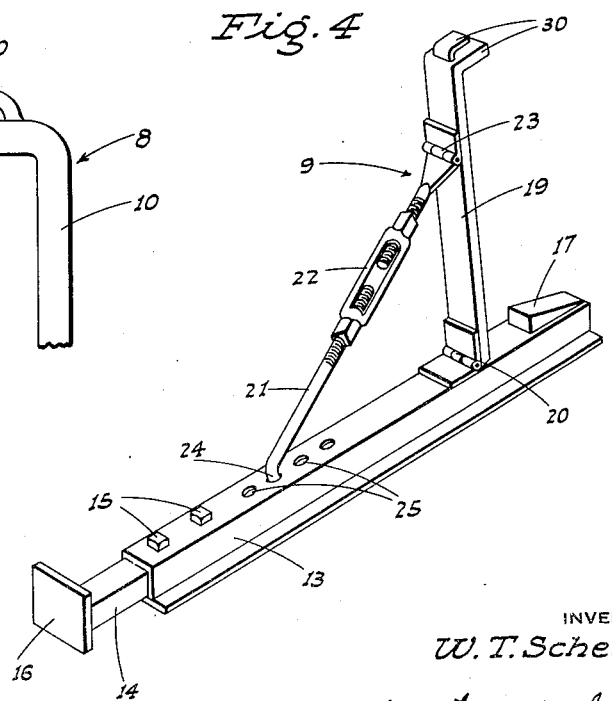
Fig. 4 is a perspective view of one of the post structures of the front post assembly.

A diagonal brace 21, having a turnbuckle 22 interposed therein, is hinged or pivoted, at its upper end, as at 23, to each post 19, and thence extends at a downward and rearward incline. At its lower end each diagonal brace 21 includes a hook 24 engaged, selectively, in one of a row of holes 25 in the base bar 13. The front post assembly 9 thus comprises a transversely spaced pair of the base and post structure shown in Fig. 4, and as above described.

The hammock unit 7 includes a flexible hammock 26 connected, at the ends, by tension springs 27 to rigid end rails 28. Reinforcing wires 29 are stitched to the hammock 26 lengthwise thereof, and in transversely spaced relation, to reinforce such hammock.

At their upper ends the rear posts 10 and front posts 19 are formed with longitudinally and outwardly projecting, double-lipped hooks 30, and the end rails 28 are formed, as at 31, for complementary, releasable engagement with said double-lipped hooks. In this manner the hammock unit 7 is effectively but releasably secured to the posts.

When the hammock unit 7 is so attached to the post assemblies 8 and 9, the hammock 26 is tensioned by adjustment of the turnbuckles 22 in a direction to increase the effective length of the diagonal braces 21, swinging the front posts 19 forwardly; i. e. in a direction away from the rear posts 10.

With the automobile bed mounted as above, the bedding is place on the hammock unit 7, and access to the bed is readily had through either of the rear doors of the automobile body 1.

When the bed is not in use, the hammock unit 7 is detached from the post assemblies and removed, and the post structures of the front post assembly 9 are released and folded. These detached parts are bundled and carried in the trunk of the automobile, where they are out of the way for travel.

As will be evident, the mounting of such removable bed parts for use of the bed is a simple and easy operation, requiring no special technique or tools, other than a hand wrench for an adjustment of the screws 15.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A bed for an automobile which includes, to the rear of the front seat, a rear floor, a rear seat riser, a rear seat platform, and a trunk deck, all exposed in a single compartment upon removal of the rear seat cushion and back; said bed comprising a front post assembly adapted to be mounted on the rear floor, a rear post assembly being adapted to be mounted on the trunk deck, a hammock unit extending between the post assemblies, the hammock unit including rigid, transverse end rails, and means to secure said rails to corresponding post assemblies; said front post assembly including transversely spaced, longitudinally adjustable base members on the rear floor adjustable for engagement between the front seat and rear seat riser, and a post upstanding from each base member.

2. A bed for an automobile which includes, to the rear of the front seat, a rear floor, a rear seat riser, a rear seat platform, and a trunk deck, all exposed in a single compartment upon removal of the rear seat cushion and back; said bed comprising a front post assembly adapted to be mounted on the rear floor, a rear post assembly being adapted to be mounted on the trunk deck, a hammock unit extending between the post assemblies, the hammock unit including rigid, transverse end rails, and means to secure said rails to corresponding post assemblies; said front post assembly including transversely spaced, longitudinally adjustable base members on the rear floor adjustable for engagement between the front seat and rear seat riser, a foot on the rear end of each base member abutting said riser, and a post upstanding from each base member.

3. A bed for an automobile which includes, to the rear of the front seat, a rear floor, a rear seat riser, a rear seat platform, and a trunk deck, all exposed in a single compartment upon removal of the rear seat cushion and back; said bed comprising a front post assembly adapted to be mounted on the rear floor, a rear post assembly being adapted to be mounted on the trunk deck, a hammock unit extending between the post assemblies, the hammock unit including rigid, transverse end rails, and means to secure said rails to corresponding post assemblies; said front post assembly including transversely spaced, longitudinally adjustable base members on the rear floor adjustable for engagement between the front seat and rear seat riser, a foot on the rear end of each base member abutting said riser, a wedge block on the front end of each base member engaged beneath the front seat, and a post upstanding from each base member.

4. A structure as in claim 1 in which each of said last named posts is hinged to the base member, and an extensible diagonal brace interposed between the base and the inner side of each post and operative to swing the post outwardly to place the hammock under tension between the post assemblies.

5. A structure as in claim 4 in which the hammock rails are channel-shaped, the upper end of each post being provided with a double-lipped hook complementary to the channel-shaped rails and interfitting therewith whereby to positively interlock the rails to the posts when the hammock is supported on the posts.

WALTER T. SCHELD.

REFERENCES CITED

The following references are of record in the file of this patent:

UNITED STATES PATENTS

| Number | Name | Date |
| --- | --- | --- |
| 1,063,461 | Meeks | June 3, 1913 |
| 1,347,413 | Schaefer | July 20, 1920 |
| 1,876,101 | Thum | Sept. 6, 1932 |
| 1,925,607 | Rottmer | Sept. 5, 1933 |
| 2,348,217 | Jones | May 9, 1944 |